United States Patent
Brafman et al.

(10) Patent No.: US 10,528,458 B2
(45) Date of Patent: Jan. 7, 2020

(54) CONTINUOUS INTEGRATION AND CONTINUOUS DEPLOYMENT SYSTEM FAILURE ANALYSIS AND RESOLUTION

(71) Applicant: EntIT Software LLC, Sunnyvale, CA (US)

(72) Inventors: Gali Brafman, Yehud (IL); Gil Baruch, Yehud (IL); Miroslav Novak, Prague (CZ)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/693,175

(22) Filed: Aug. 31, 2017

(65) Prior Publication Data

US 2019/0065357 A1    Feb. 28, 2019

(51) Int. Cl.
  *G06F 11/36*    (2006.01)
  *G05B 23/02*   (2006.01)

(52) U.S. Cl.
  CPC ...... *G06F 11/3692* (2013.01); *G05B 23/0275* (2013.01); *G06F 11/3608* (2013.01); *G06F 11/366* (2013.01)

(58) Field of Classification Search
  CPC ............ G06F 11/3604; G06F 11/3608; G06F 11/3612; G06F 11/3616; G06F 11/366; G06F 11/3664; G06F 11/3668; G06F 11/3672; G06F 11/3692
  USPC ................ 717/124, 126, 127, 131
  See application file for complete search history.

(56) References Cited

U.S. PATENT DOCUMENTS

| | | | | |
|---|---|---|---|---|
| 7,200,774 B2* | 4/2007 | Vollmar | ............. | G05B 23/0251 |
| | | | | 714/26 |
| 7,707,552 B2* | 4/2010 | Schmidt | .............. | G06F 11/3604 |
| | | | | 714/38.14 |
| 8,595,685 B2 | 11/2013 | Sharma | | |
| 8,621,441 B2* | 12/2013 | Landwehr | ........... | G06F 11/3604 |
| | | | | 714/38.1 |
| 8,924,935 B1 | 12/2014 | Chopra | | |
| 8,935,676 B2* | 1/2015 | Verbest | ............... | G06F 11/3672 |
| | | | | 714/35 |

(Continued)

FOREIGN PATENT DOCUMENTS

CN     103490938 A     1/2014

OTHER PUBLICATIONS

Luo, Q., et al., An Empirical Analysis of Flaky Tests, Proceedings of the 22nd ACM SIGSOFT International Symposium on Foundations of Software Engineering, Nov. 16-21, 2014, pp. 643-653, [retrieved on Sep. 18, 2019], Retrieved from the Internet.*

(Continued)

*Primary Examiner* — Geoffrey R St Leger (57) ABSTRACT

In some examples, continuous integration and continuous deployment (CI/CD) system failure analysis and resolution may include analyzing data for a CI/CD system to identify anomalous tests related to the CI/CD system. A plurality of hypotheses on a cause of failure associated with the CI/CD system may be determined based on a further analysis of the analyzed data. The determined hypotheses may be prioritized based on a confidence level analysis. Failure resolution to prevent failure associated with the CI/CD system may be determine based on a response to one of the prioritized hypotheses. Further, the determined failure resolution may be implemented.

14 Claims, 7 Drawing Sheets

(56) References Cited

U.S. PATENT DOCUMENTS

| | | | |
|---|---|---|---|
| 9,032,259 B1* | 5/2015 | Hood | G06F 11/3692 |
| | | | 714/57 |
| 9,176,731 B1* | 11/2015 | Ziftci | G06F 8/73 |
| 9,311,220 B1* | 4/2016 | Ha | G06F 11/3636 |
| 9,519,477 B2 | 12/2016 | Champlin-Scharff | |
| 2003/0135786 A1* | 7/2003 | Vollmar | G05B 23/0251 |
| | | | 714/25 |
| 2007/0089092 A1* | 4/2007 | Schmidt | G06F 8/10 |
| | | | 717/126 |
| 2009/0292941 A1 | 11/2009 | Ganai | |
| 2012/0167060 A1* | 6/2012 | Landwehr | G06F 11/3604 |
| | | | 717/132 |
| 2012/0185731 A1* | 7/2012 | Barman | G06F 11/3604 |
| | | | 714/38.1 |
| 2013/0036405 A1* | 2/2013 | Verbest | G06F 11/3672 |
| | | | 717/131 |
| 2013/0152047 A1 | 6/2013 | Moorthi | |
| 2014/0380280 A1* | 12/2014 | Millwood | G06F 11/366 |
| | | | 717/127 |
| 2015/0081614 A1* | 3/2015 | Bechet | G06N 5/027 |
| | | | 706/52 |
| 2016/0117239 A1* | 4/2016 | Hamilton, II | G06F 11/3684 |
| | | | 717/124 |
| 2017/0344459 A1* | 11/2017 | Horesh | G06F 11/3644 |

OTHER PUBLICATIONS

Labuschagne, A., et al., Measuring the Cost of Regression Testing in Practice: A Study of Java Projects using Continuous Integration, Proceedings of the 2017 11th Joint Meeting on Foundations of Software Engineering, Sep. 4-8, 2017, pp. 821-830, [retrieved on Sep. 18, 2019], Retrieved from the Internet.*

Atlassian Documentation, "Assigning Responsibility for Build Failures", 2013, pp. 2. https://confluence.atlassian.com/bamboo/assigning-responsibility-for-build-failures-289276918.html.

* cited by examiner

ANALYZE DATA FOR A CONTINUOUS INTEGRATION AND CONTINUOUS DEPLOYMENT (CI/CD) SYSTEM TO IDENTIFY ANOMALOUS TESTS RELATED TO THE CI/CD SYSTEM, A LIKELIHOOD OF A FILE CHANGE OF THE CI/CD SYSTEM TO CAUSE A TEST FAILURE, LOG MESSAGES ASSOCIATED WITH BUILD FAILURES, AND TESTS THAT FAIL DUE TO A SIMILAR REASON
602

DETERMINE, BASED ON A FURTHER ANALYSIS OF THE ANALYZED DATA, A PLURALITY OF HYPOTHESES ON A CAUSE OF FAILURE ASSOCIATED WITH THE CI/CD SYSTEM
604

PRIORITIZE, BASED ON A CONFIDENCE LEVEL ANALYSIS, THE DETERMINED HYPOTHESES
606

DETERMINE, BASED ON A RESPONSE TO ONE OF THE PRIORITIZED HYPOTHESES, FAILURE RESOLUTION TO PREVENT FAILURE ASSOCIATED WITH THE CI/CD SYSTEM
608

IMPLEMENT THE DETERMINED FAILURE RESOLUTION
610

CONTINUOUS INTEGRATION AND CONTINUOUS DEPLOYMENT SYSTEM FAILURE ANALYSIS AND RESOLUTION

BACKGROUND

With respect to development of a product, such as a software product, a developer may utilize a variety of strategies to design the product. During testing of the product, various operational problems with the product may be identified by executing specified tests. The operational problems may result from a variety of factors associated with development of the product.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Continuous integration and continuous deployment (CI/CD) system failure analysis and resolution apparatuses, methods for CI/CD failure analysis and resolution, and non-transitory computer readable media having stored thereon machine readable instructions to provide CI/CD failure analysis and resolution are disclosed herein. The apparatuses, methods, and non-transitory computer readable media disclosed herein provide for implementation of failure resolution for a CI/CD system by forming hypotheses with respect to potential root causes of failures, and recommendation of a resolution flow for users. In this regard, information such as anomalous tests related to a CI/CD system, a likelihood of a file change of the CI/CD system to cause a test failure, log messages associated with build failures, and tests that fail due to a similar reason, may be extracted from the CI/CD system. Hypotheses (which may be potentially contradicting) may be prioritized, presented one-by-one to a user, and reprioritized based on user feedback. A failure resolution may be determined based on the user's response to the reprioritized hypotheses. The failure resolution may be automatically implemented to prevent failure associated with the CI/CD system.

In the area of product development, such as software product development, CI/CD may represent standards for developing such products. Build servers that implement CI/CD may influence efficiency of development teams and/or development organizations associated with the development teams. As a greater number of tasks are automated within build pipelines, a product may be delivered faster to production. This accelerated time to production may however add technical complexity to the identification and/or resolution of failures associated with a CI/CD system. The root cause of the failure may be in many different domains. Thus, it is technically challenging to determine the cause of the failure, and how to resolve the failure. It is also technically challenging to determine who is to be involved in the failure resolution. For example, identification and/or resolution of the failure may need expertise of CI/CD owners, developers, quality engineers responsible for a set of tests, automation experts maintaining automation framework, operation engineers maintaining provisioning of staging and production environments, etc.

Additional factors that may add technical challenges to the identification and/or resolution of failure may include project size and phase of delivery. For example, a highly complex software product may need to be delivered with weekly cadence or even faster.

In order to address at least the aforementioned technical challenges associated with identification and/or resolution of failure associated with a CI/CD system, the apparatuses, methods, and non-transitory computer readable media disclosed herein may implement machine learning to provide additional hints in the form of hypotheses to resolve a particular failure. The apparatuses, methods, and non-transitory computer readable media disclosed herein may analyze data produced by build pipelines to serve expert suggestions, and dispatch flows to teams related to a build process.

The apparatuses, methods, and non-transitory computer readable media disclosed herein may provide for the reduction of time needed to perform build failure analysis. In this regard, the apparatuses, methods, and non-transitory computer readable media disclosed herein may provide resolution to inquiries such as (1) why a failure occurred, (2) whether the failure is a new problem or reoccurring issue, (3) if reoccurring, how it was fixed in previous times and by whom, (4) whether the failure is isolated in one component or in many places, (5) whether there is a commit which might be causing the issue, (6) how the failure should be fixed and where to start, etc.

The apparatuses, methods, and non-transitory computer readable media disclosed herein may utilize data from a CI/CD system and other processes which add additional insights to CI/CD data, form hypotheses about potential root causes of the failures, and suggest a resolution flow for users. The apparatuses, methods, and non-transitory computer readable media disclosed herein may include the extraction of information such as CI/CD data that includes build pipeline metadata, build logs, code changes metadata, test results, etc. The extracted information may further include insights from processes such as problematic tests, blame committers, log analytics, test clustering, and build failure classification. The information from problematic tests, blame committers, log analytics, and test clustering may be used to form hypotheses as disclosed herein. Further, the information from build failure classification, process specificity (with weights which may be adjusted), and confidence levels may be used to prioritize hypotheses as disclosed herein.

With respect to problematic tests, this process may identify anomalous tests (e.g., tests which are operating incorrectly). The categories of "bad" tests that may be detected may include oscillating tests, where, by examining a brief history of tests (last X runs—e.g., 8), the number of transitions from passed to failed, and vice versa, may be counted. If the number of transitions are greater than a threshold (e.g., 4), the test may be marked as oscillating (e.g., randomly changing status). Failures of such a test may be disregarded and the test may need to be fixed. For continuously failing tests, such tests may fail non-stop, and may need to be identified (e.g., X continuous failures). With respect to unstable tests, information related to regressions (e.g., slowdowns), skipped tests, etc., may represent additional information which may help users with failure resolution. For example, with respect to commits, if regressions are detected in failing tests, this information may be used to conclude that the identified commit that led to the failing test is the root cause.

With respect to blame committers, this process may analyze previous builds with commits and failing tests to determine how likely it is for a file change to cause failure of a test (e.g., every time a file A.java was changed, a test TestA.java is failing. Next time, A.java is changed, and TestA.java is failing, it is reasonable to consider that A.java is the root cause).

With respect to log analytics (e.g., finding problematic log messages), this process may identify similar log lines over history of all builds (clusters). The process may then determine how these clusters are correlated to build failures (e.g., to failing builds vs. passing builds).

With respect to test clustering, this process may identify tests failing together. Tests which fail because of the same reason (e.g., bug in a software component) may be marked as group.

With respect to build failure classification, this process may include marking of builds with labels which describe a type of the problem. In the future, based on the examination of prior classifications, this process may determine what type of problem occurred.

According to an example, for the apparatuses, methods, and non-transitory computer readable media, the hypotheses may be presented to a user in a one-by-one manner, where depending on findings, users may proceed to other options. Within a hypothesis, the information to approve/reject a hypothesis may be presented, together with a drill-down link to provide information needed in that particular case.

According to an example, the apparatuses, methods, and non-transitory computer readable media may also provide insights as to who should investigate failures depending on the type failure.

According to an example, once a user is presented with hypotheses on potential causes of a failure, an associated flow may be adjusted depending on the actions taken by a user.

According to an example, the apparatuses, methods, and non-transitory computer readable media disclosed herein provide for determination of hypotheses based on evaluation of data that includes anomalous tests related to a CI/CD system, a likelihood of a file change of the CI/CD system to cause a test failure, log messages associated with build failures, and tests that fail due to a similar reason. In this regard, the CI/CD system failure analysis and resolution technique as disclosed herein may include determination, based on an analysis of the data, of a plurality of hypotheses on a cause of failure associated with the CI/CD system, prioritization, based on a confidence level analysis, of the determined hypotheses, and reprioritization, based on a response to one of the prioritized hypotheses, of the prioritized hypotheses. Further, the CI/CD system failure analysis and resolution technique as disclosed herein may include determination, based on another response to one of the reprioritized hypotheses, of failure resolution to prevent failure associated with the CI/CD system, and implementation of the determined failure resolution.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

Figure 1:
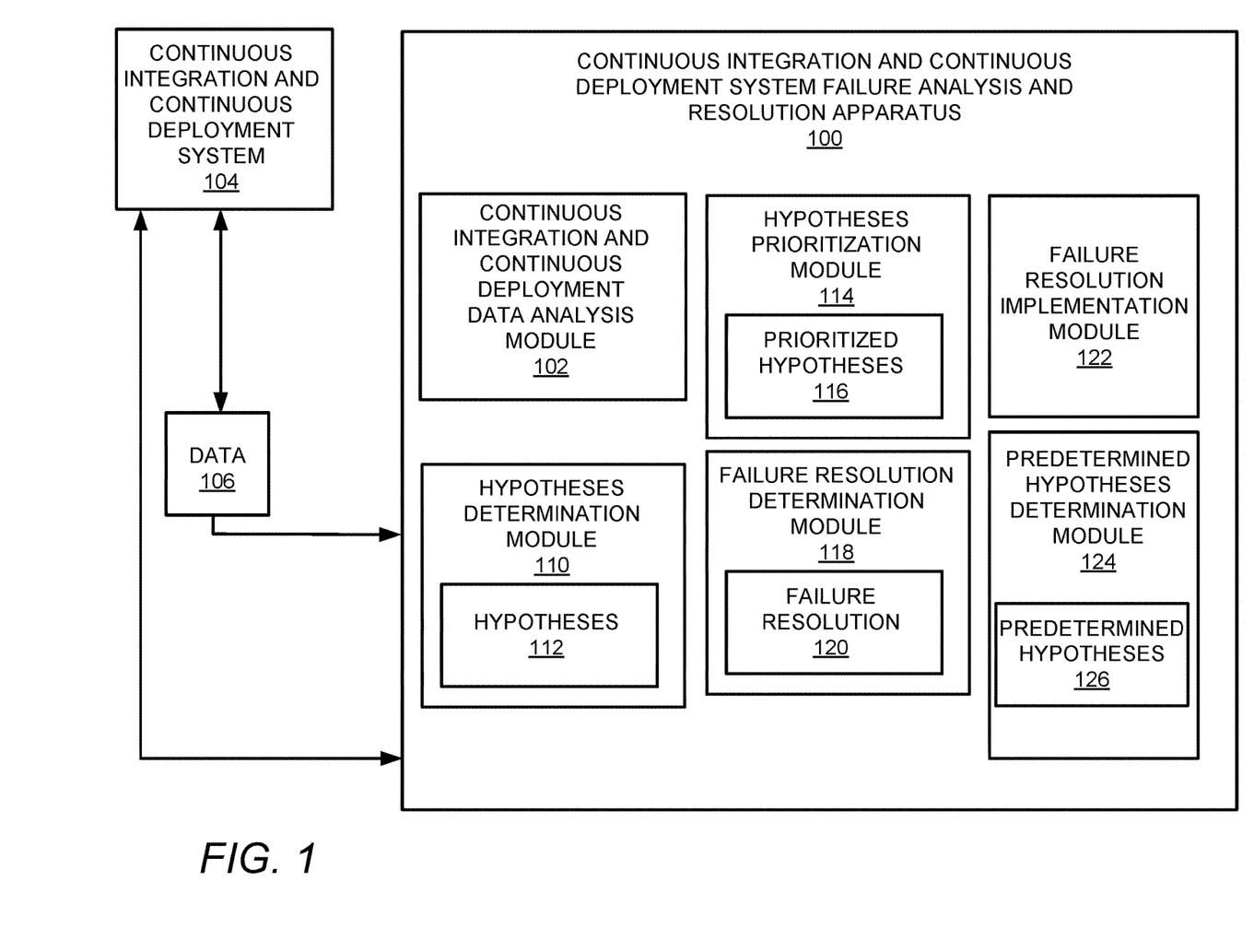
FIG. 1 illustrates an example layout of a continuous integration and continuous deployment (CI/CD) system failure analysis and resolution apparatus.

FIG. 1 illustrates an example layout of a continuous integration and continuous deployment system failure analysis and resolution apparatus (hereinafter also referred to as "apparatus 100").

Referring to FIG. 1, the apparatus 100 may include a CI/CD data analysis module 102 to analyze data 106 from a CI/CD system 104. According to an example, the data 106 may be analyzed to identify anomalous tests related to the CI/CD system 104, a likelihood of a file change of the CI/CD system 104 to cause a test failure, log messages associated with build failures, and tests that fail due to a similar reason.

According to an example, the CI/CD data analysis module 102 is to analyze the data 106 to identify anomalous tests related to the CI/CD system 104 by identifying a test that oscillates between passed and fail, a test that continuously fails, and a test that is unstable.

According to an example, the CI/CD data analysis module 102 is to analyze the data 106 to identify a likelihood of a file change of the CI/CD system 104 to cause a test failure by identifying a test that fails when a file is changed.

According to an example, the CI/CD data analysis module 102 is to analyze the data 106 to identify log messages associated with build failures by identifying a log cluster that is formed from the log messages and is correlated to a build failure.

According to an example, the CI/CD data analysis module 102 is to analyze the data 106 to identify tests that fail due to a similar reason by forming a group of the tests that fail due to the similar reason.

A hypotheses determination module 110 is to determine (e.g., generate), based on a further analysis of the analyzed data 106, a plurality of hypotheses 112 on a cause of failure associated with the CI/CD system 104.

A hypotheses prioritization module 114 is to prioritize, based on a confidence level analysis, the determined hypotheses 112 (e.g., to generate prioritized hypotheses 116).

According to an example, the hypotheses prioritization module 114 is to prioritize, based on the confidence level analysis, the determined hypotheses 112 by analyzing specificity weights associated with a likelihood of a file change of the CI/CD system 104 to cause a test failure, log messages associated with build failures, anomalous tests, and tests that fail due to a similar reason.

A failure resolution determination module 118 is to determine, based on a response (e.g., a user response) to one of the prioritized hypotheses 116, failure resolution 120 to prevent failure associated with the CI/CD system 104.

A failure resolution implementation module 122 is to implement the determined failure resolution 120.

According to an example, the hypotheses prioritization module 114 is to reprioritize, based on the response to one of the prioritized hypotheses 116, the prioritized hypotheses 116. Further, the failure resolution determination module 118 is to determine, based on another response to one of the reprioritized hypotheses, the failure resolution 120 to prevent failure associated with the CI/CD system 104.

A predetermined hypotheses determination module 124 is to determine, based on responses to all of the prioritized hypotheses 116, whether none of the prioritized hypotheses 116 is relevant. In response to a determination that none of the prioritized hypotheses 116 is relevant, the predetermined hypotheses determination module 124 is to identify a plurality of predetermined hypotheses 126. The predetermined hypotheses 126 may also be designated as fallback hypotheses. In this regard, the failure resolution determination module 118 is to determine, based on another response to one of the predetermined hypotheses 112, the failure resolution 120 to prevent failure associated with the CI/CD system 104.

Operation of the various components of the apparatus 100 is described in further detail.

With respect to formation of the hypotheses 112, the hypotheses determination module 110 is to determine (e.g., generate), based on a further analysis of the analyzed data 106, a plurality of hypotheses 112 on a cause of failure associated with the CI/CD system 104. In this regard, the hypotheses determination module 110 is to determine the plurality of hypotheses 112 based on a problematic tests process, code issues (e.g., caused by commits), test issues (e.g., the same root cause), and build issues, each of which are described herein.

The problematic tests process may be used to determine hypotheses about "broken tests". The categories of problematic tests that may be considered include continuously failing, oscillating, and unstable. Continuously failing problematic tests may include a determination of whether the last X runs of a unique test run failed (or were skipped). Oscillating problematic tests may include a determination of whether there are at least Y status changes between the last X runs of a unique test run (e.g., status change is a switch from passed status to failed status in the next run or vice versa). Unstable problematic tests may include a determination of whether the last Z test runs of a unique test run include Q failures surrounded by passed runs (previous and next runs passed). The unique test run may represent runs of a test in an environment in which the test runs. Further, for the examples above, X, Y, Z, and Q may be constants. According to an example, X may be set to 8, Y may be set to 4, Z may be set to 50, and Q may be set to 10, but may be adjusted depending on specifics of an environment.

With respect to the problematic tests process, for each test, information about test may be ascertained, for example, from a test owner since the test owner may represent the maintainer of the test, and thus be aware of the knowledge to fix the test.

With respect to the problematic tests process, according to an example, other categories of problematic tests may include regression, skipped, slowdowns, etc., and may be displayed as an additional information on the tests that are part of other hypotheses.

With respect to code issues (e.g., caused by commits), the hypotheses determination module 110 is to form hypotheses about committers causing failures based on the blame committers process (e.g., each committer whose commit is likely causing a failure will represent a hypothesis).

With respect to the blame committers process, the likelihood threshold may represent a parameter of the process, and may be changed by a user. The parameter may be adjusted based on feedback provided by users during the failure analysis.

With respect to the blame committers process, for each committer (commit hypothesis), the hypotheses determination module 110 is to ascertain information about commits, confidence of the relationship between failures and commits, a suggested expert who should fix the failure together with confidence, and tests which fail because of the commits together with confidence.

With respect to test issues (e.g., the same root cause), the hypotheses determination module 110 is to form hypotheses about a group of tests likely failing because of the same root cause based on the test clustering process. In this regard, the hypotheses determination module 110 is to sort clusters identified by the test clustering process by a metric equal to: {match ratio}*log 2 ({normal size}). The match ratio may be equal to: {tests from the cluster failing in this pipeline run}/{all tests in the cluster}. The normal size may be equal to: normal size−{size of cluster}/{size of the largest cluster in this pipeline run}. For each cluster (e.g., test issue hypothesis), the hypotheses determination module 110 is to ascertain a number of tests in the cluster and tests in the cluster in this pipeline run, a label of the cluster, the last "on it" user(s), a suggested expert who should fix it: the most probable user from "on it" users for last two failing runs of tests in the cluster failing in this pipeline run, and tests which belong to the cluster. The last "on it" user may represent a user assigned to a cluster (if any) or users assigned to tests that are in a cluster. According to an example, the user may include developer, a tester, etc.

With respect to build issues, the hypotheses determination module 110 is to form hypotheses about failing builds based on the log analytics process. In this regard, for each failing build, the hypotheses determination module 110 is to form a hypothesis. The hypotheses determination module 110 is to ascertain a build label (e.g., from the build failure classification process). Further, the hypotheses determination module 110 is to ascertain most relevant log lines from a build log (e.g., most relevant X lines where X is a parameter, and may be set as default to five). Further, the hypotheses determination module 110 is to ascertain build metadata (e.g., job, number, build time, amount of changes, number of tests, etc.). Further, the hypotheses determination module 110 is to ascertain a full log with information log lines relevant to failure, and a list of similar builds (similar past failures).

With respect to build issues, because of hierarchical nature of builds, failing builds may be presented in a hierarchical manner. When a failing build was triggered by a different failing build, these builds may be displayed as parent-child. Further, the start time of builds may determine order of siblings.

With respect to build issues, when rendering failing builds, builds which receive a label from the build failure classification process may be emphasized. Build emphasis may also reflect a number of tests failing in a build, and number of failing child builds.

Referring again to FIG. 1, as discussed above, the predetermined hypotheses determination module 124 is to determine, based on responses to all of the prioritized hypotheses 116, whether none of the prioritized hypotheses 116 is relevant, and in response to a determination that none of the prioritized hypotheses 116 is relevant, the predetermined hypotheses determination module 124 is to identify a plurality of predetermined hypotheses 126. The predetermined hypotheses 126 may also be designated as fallback hypotheses.

With respect to the predetermined hypotheses 126, the predetermined hypotheses determination module 124 is to provide hypotheses to a user even when the underpinning processes discussed above do not provide any insights. With respect to the blame committers, log analytics, and test clustering processes, heuristics may be used for failure resolution. For example, when the log analytics process does not identify any significant log lines, the predetermined hypotheses determination module 124 is to take the last X lines from the build log (X is a parameter, which may be set as default to five).

With respect to the predetermined hypotheses 126, when no clusters are identified by the test clustering process, the predetermined hypotheses determination module 124 is to assume grouping builds.

With respect to the predetermined hypotheses 126, when the blame committers process does not discover any suspicious commits, the predetermined hypotheses determination module 124 is to assume a relationship based on the same application module (e.g., tests and commits belong to the same module), and based on a match of the commit and error information (e.g., error message and stack trace match modified files).

With respect to the predetermined hypotheses 126, when the build failure classification process does not identify any labels, the predetermined hypotheses determination module 124 is to assign labels based on rules defined by users. For example, users may define a rule (e.g., a predicate) which uses as the input information from the apparatus 100 and build logs. For example, rules may specify that "when more than 50% tests fail, assign 'environment' label" or "when build log contains log like 'error getting the parameters from the hub', assign label 'environment—selenium hub'", etc.

Referring again to FIG. 1, as discussed above, the hypotheses prioritization module 114 is to prioritize the determined hypotheses 112. For example, the hypotheses prioritization module 114 is to prioritize the determined hypotheses 112 by applying the build failure classification process to determine an ordered list (e.g., by confidence) of types of issues in a pipeline run, where the list may be empty.

Alternatively or additionally, the hypotheses prioritization module 114 is to prioritize the determined hypotheses 112 based on process specificity. In this regard, "specificity" expresses how suitable a hypothesis of a certain type is depending on what type of the problem is being faced. For example, the blame committers, log analytics, and test clustering processes may be associated with various specificities depending on the type of the problem. These processes may provide various levels of information with respect to the root cause of a problem and how to fix the problem. Therefore, specificity weights may be assigned to the processes for different types of problems. These specificity weights may be directly adjusted by users, or automatically adjusted based on user feedback and flow of users through failure resolution.

With respect to specificity weights, assuming that based on blame committers a code issue hypothesis includes a confidence of 58%, and based on test clustering a test clustering hypothesis includes a confidence of 61%, a determination may need to be made as to which hypothesis is correct. Assuming that the build failure classification process reported a code issue with a confidence of 90%, in this case, a weight of 0.95 may be ascertained for blame committers from the table of FIG. 2 as shown at 200, and applied (e.g., by multiplying) the confidence provided by the blame committers process and the build failure classification process to determine a code issue hypothesis priority (e.g., 58%*90%*95%=49.59%). For the test clustering hypothesis, because the build failure classification process indicated code issues, for the test clustering hypothesis, the weight of 70% may be ascertained from the table of FIG. 2 as shown at 202, and applied to determine a test clustering hypothesis priority (e.g., 61%*90%*70%=38.43%). Thus, the code issue hypothesis may include the higher priority (e.g., likelihood). In this case, the specificity weights may be used to determine how likely it is for a certain hypothesis to be suitable for a case detected by build failure classification.

Alternatively or additionally, the hypotheses prioritization module 114 is to prioritize the determined hypotheses 112 based on confidence level of a particular hypothesis. When the confidence level is not known, the confidence level may be set to 0.5.

Alternatively or additionally, the hypotheses prioritization module 114 is to prioritize the determined hypotheses 112 based on user feedback. In this regard, when analyzing failures, users may reject presented hypotheses or indicate failure type. Based on this information, the list of hypotheses may be adjusted.

Figure 2:
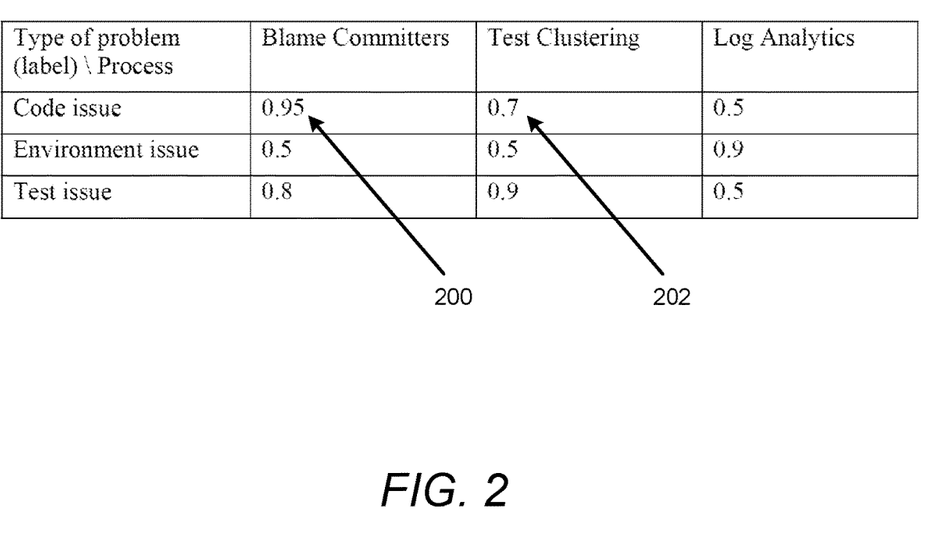
FIG. 2 illustrates process specificity to illustrate operation of the CI/CD system failure analysis and resolution apparatus of FIG. 1 according to an example.

FIG. 2 illustrates process specificity to illustrate operation of the apparatus 100.

Referring to FIG. 2, the "type of problem (label)" may apply to the code issues, environment issues, and test issues, and the "process" may apply to blame committers, test clustering, and log analytics. For example, build failure classification may produce the label, and the priority for the resolution process may need to be determined (e.g., "proceed to blame committers?". Further, by default, specificity may be set as shown in FIG. 2. For example, specificity 200 for blame committers and code issues may be set at 0.95, specificity 202 for test clustering and code issues may be set at 0.7, etc. In this regard, the table of FIG. 2 may be determined based on expert suggestions. However, other values may be used depending on the environment.

After forming the hypotheses 112, the confidence levels of hypotheses may be adjusted. In this regard, the hypotheses prioritization module 114 is to adjust the confidence levels by specificity weights and build label confidence as follows:

$$\{\text{confidence of a hypothesis}\} * \{\text{build label confidence}\} * \{\text{specificity weight for the label and process used to form hypothesis}\} \quad \text{Equation (1)}$$

The hypotheses prioritization module 114 is to order the hypotheses 112 by the metric determined by Equation (1).

Referring again to FIG. 1, as discussed above, the hypotheses prioritization module 114 is to reprioritize, based on the response to one of the prioritized hypotheses 116, the prioritized hypotheses 116. For example, the hypotheses prioritization module 114 is to use user feedback to reprioritize hypotheses where hypotheses are first presented one by one, starting from the most relevant hypothesis. For each hypothesis, the hypotheses prioritization module 114 is to generate a summary, and provide for access of information backing up the hypothesis. For hypotheses of different types, different information may be presented.

Regardless of the type of the hypothesis, the hypotheses prioritization module 114 is to provide:
the type of the problem,
the most likely expert to fix the issue
an indication about "on it" status (whether someone is assigned, percentage of issues assigned, etc.)
an indication about acceptance of the hypothesis (whether a user already approved the hypothesis)
an action to assign the issue as "on it" to the expert
an action to assign label if the issue was not yet classified
an action to provide feedback: hypothesis is correct/incorrect
an action to change label (of the hypothesis and related builds)
drill-down links to detail views formed according to hypothesis (presenting details about data relevant for the specific hypothesis)
an action to start discussion/collaboration (e.g., send e-mail, open chat and invite related stakeholders)
summary and links to similar failures happening in the past.

Referring again to FIG. 1, as discussed above, the failure resolution determination module 118 is to actively walk users through the failure resolution. For example, users may explore additional hypothesis (e.g., instead of reviewing "current most relevant", explore additional options). Additionally or alternatively, users may reject a hypothesis. When a hypothesis is rejected, a user may indicate a type of problem based on current findings. The user's input may be used to reprioritize existing hypotheses in the same way they are prioritized after forming hypotheses. The next most relevant hypothesis may be shown next.

With respect to the tests as disclosed herein, relevant information about failing tests may be provided. For example, the relevant information may include test name identification (e.g., package/class/test name attributes and equivalents for different testing frameworks), test identification, test owner, build context (e.g., information about the build where the test was running), application module, environment, tags, comments, "on it" user, historical "on it" (e.g., "on it" users of previous runs), historical statuses (e.g., statuses of previous runs), test health (e.g., label identified by problematic tests), cluster label and cluster identification (e.g., identified by test clustering), related commits (e.g., identified by blame committers), etc.

Figure 3:
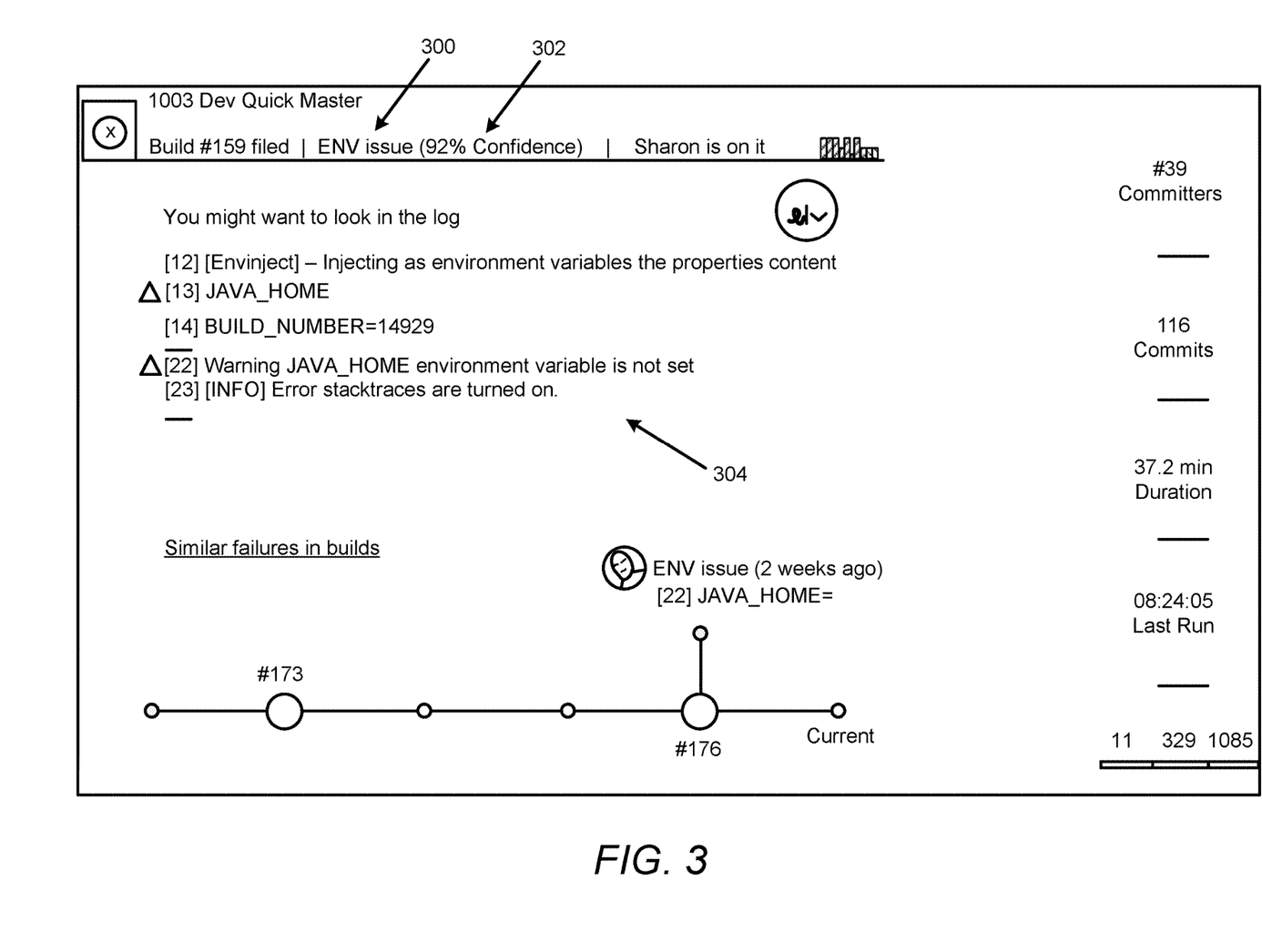
FIG. 3 illustrates hypotheses presentation to illustrate operation of the CI/CD system failure analysis and resolution apparatus of FIG. 1 according to an example.

FIG. 3 illustrates hypotheses presentation to illustrate operation of the apparatus 100.

Referring to FIG. 3, a hypothesis may be displayed at 300, and an associated confidence may be displayed at 302. At 304, an excerpt from a build log may be displayed. An output from the log analytics process may include information about most relevant lines. In this case, FIG. 3 shows these most relevant lines at [13] and [22], and additional context at [12], [14], and [23]. The additional context at [12], [14], and [23] may provide an understanding of lines before and after an error. The log analytics process may also provide information about similar builds (e.g., #173, #176). In this example, these builds failed because of a similar reason, and analyzing these builds may provide an understanding of the problem, and resolution thereof.

Figure 4:
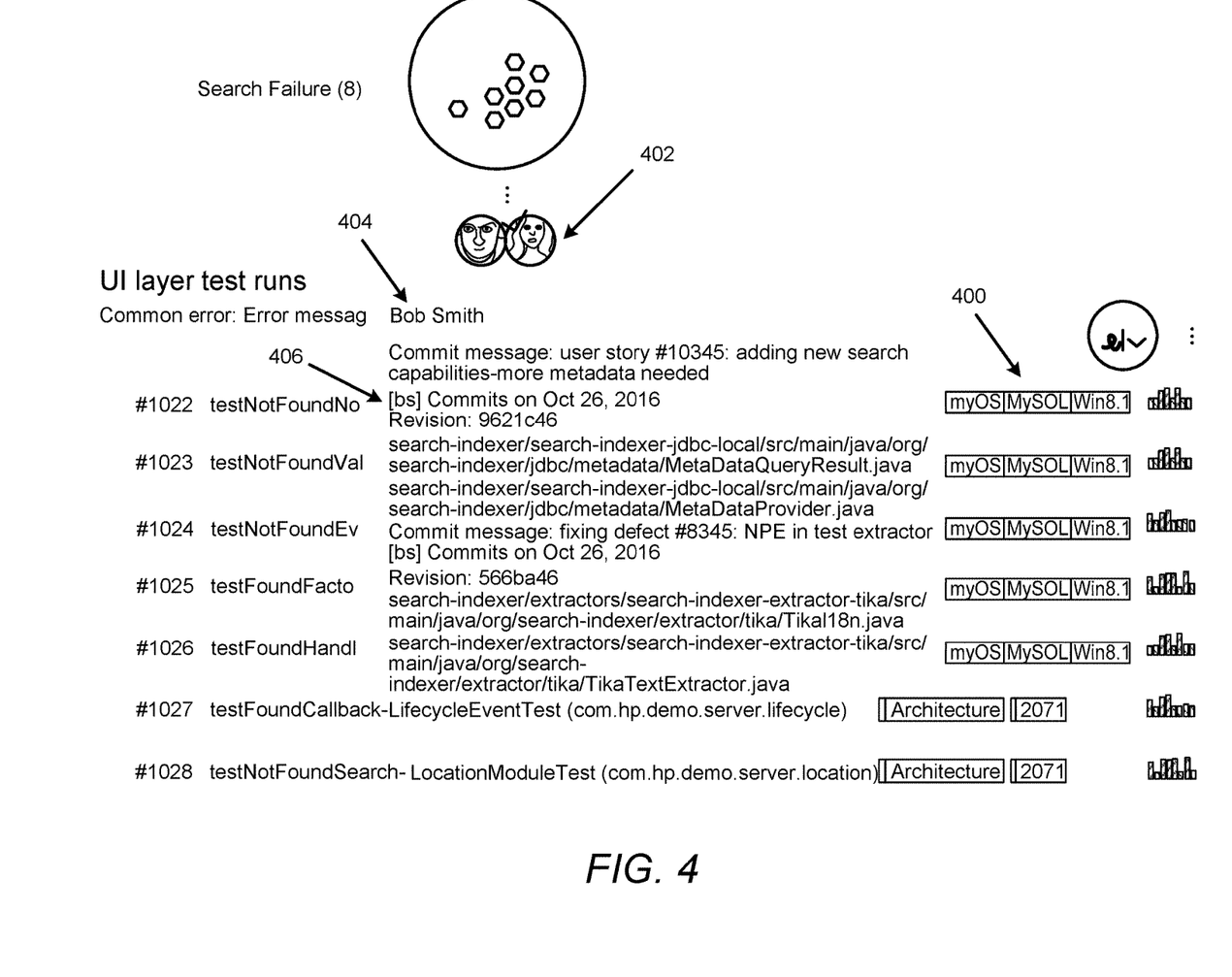
FIG. 4 illustrates hypotheses presentation to illustrate operation of the CI/CD system failure analysis and resolution apparatus of FIG. 1 according to an example.

FIG. 4 illustrates hypotheses presentation to illustrate operation of the apparatus 100.

Referring to FIG. 4, "test issues" hypothesis may be displayed. In this regard, the test clustering process may generate an indication that the tests #1022, #1023, #1024, #1025, #1026, #1027, and #1028 are failing because of the same reason. Thus, these tests may form a group (e.g., they should be treated as one issue and not as seven different issues). The tests may be grouped because of similarity of their error messages (e.g., "Common error: error message"). The information at 400 may inform users about output from blame committers. For the example of FIG. 4, the failures may be related to two committers as shown at 402. For example, at 404, the author of the commit is "Bob Smith". The location at 406 shows information about Bob Smith's commits, which may be the root cause of a problem. The first commit includes revision 9621c46, is committed on Oct. 26, 2016, includes commit message "user story #10345: adding new search capabilities-more metadata needed", and a list of modified files in this commit may be shown thereafter. Similarly, the second commit includes revision 566ba46, is committed on Oct. 26, 2016, includes commit message "fixing defect #8345: NPE in test extractor [bs] Commits on Oct. 26, 2016", and a list of modified files in this commit may be shown thereafter.

Figure 5:
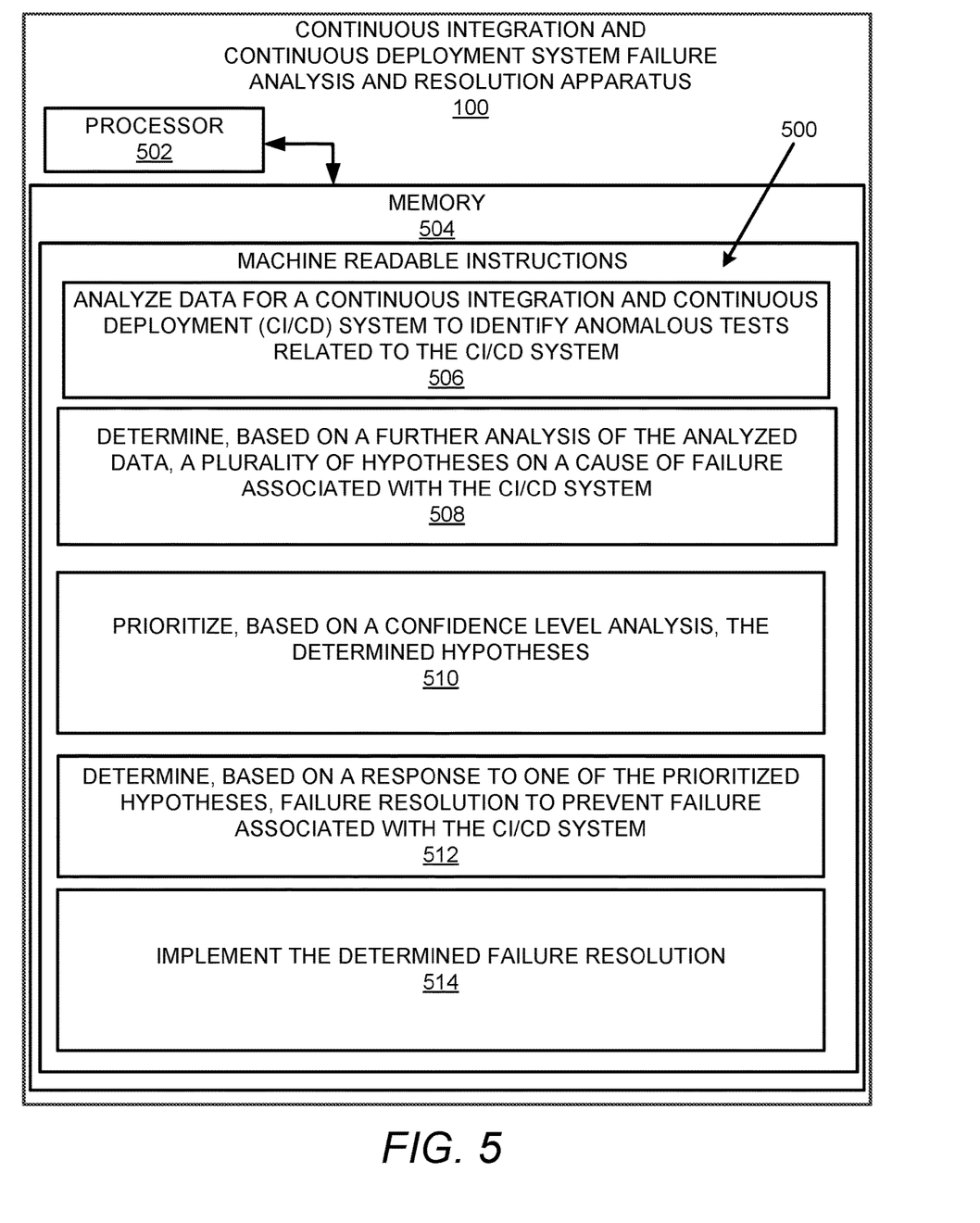
FIG. 5 illustrates an example block diagram for CI/CD system failure analysis and resolution.
Figure 6:
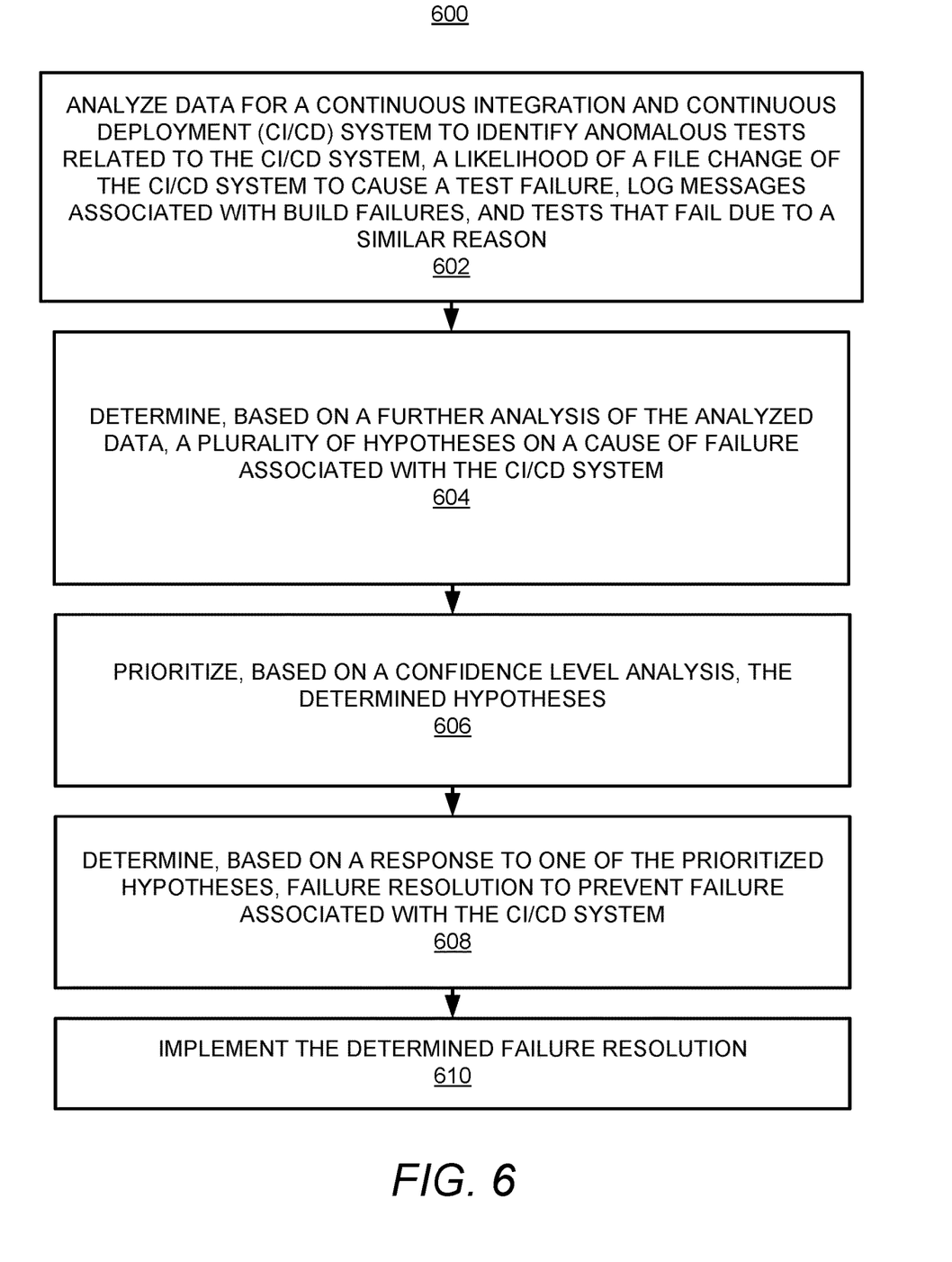
FIG. 6 illustrates an example flowchart of a method for CI/CD system failure analysis and resolution.
Figure 7:
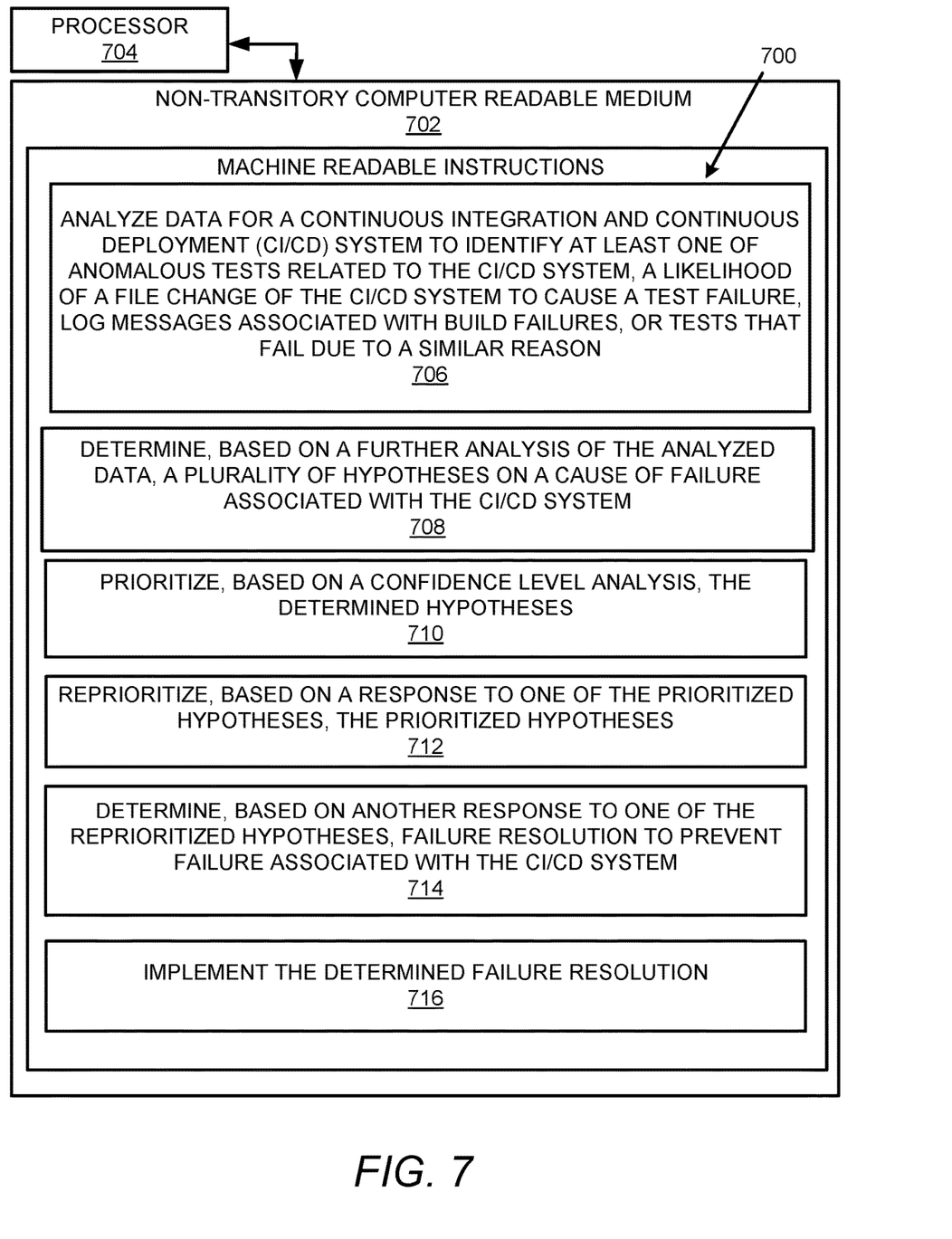
FIG. 7 illustrates a further example block diagram for CI/CD system failure analysis and resolution.

FIGS. 5-7 respectively illustrate an example block diagram 500, an example flowchart of a method 600, and a further example block diagram 700 for CI/CD system failure analysis and resolution. The block diagram 500, the method 600, and the block diagram 700 may be implemented on the apparatus 50 described above with reference to FIG. 1 by way of example and not limitation. The block diagram 500, the method 600, and the block diagram 700 may be practiced in other apparatus. In addition to showing the block diagram 500, FIG. 5 shows hardware of the apparatus 50 that may execute the instructions of the block diagram 500. The hardware may include a processor 502, and a memory 504 (i.e., a non-transitory computer readable medium) storing machine readable instructions that when executed by the processor cause the processor to perform the instructions of the block diagram 500. The memory 504 may represent a non-transitory computer readable medium. FIG. 6 may represent a method for CI/CD system failure analysis and resolution, and the steps of the method. FIG. 7 may represent a non-transitory computer readable medium 702 having stored thereon machine readable instructions to provide CI/CD system failure analysis and resolution. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to analyze data 106 for a continuous integration and continuous deployment (CI/CD) system 104 to identify anomalous tests related to the CI/CD system 104.

The processor 502 may fetch, decode, and execute the instructions 508 to determine, based on a further analysis of the analyzed data 106, a plurality of hypotheses 112 on a cause of failure associated with the CI/CD system 104.

The processor 502 may fetch, decode, and execute the instructions 510 to prioritize, based on a confidence level analysis, the determined hypotheses 112.

The processor 502 may fetch, decode, and execute the instructions 512 to determine, based on a response to one of the prioritized hypotheses 116, failure resolution 120 to prevent failure associated with the CI/CD system 104.

The processor 502 may fetch, decode, and execute the instructions 514 to implement the determined failure resolution 120.

Referring to FIGS. 1-4 and 6, and particularly FIG. 6, for the method 600, at block 602, the method may include analyzing data 106 for a continuous integration and continuous deployment (CI/CD) system 104 to identify anomalous tests related to the CI/CD system 104, a likelihood of a file change of the CI/CD system 104 to cause a test failure, log messages associated with build failures, and tests that fail due to a similar reason.

At block 604 the method may include determining, based on a further analysis of the analyzed data 106, a plurality of hypotheses 112 on a cause of failure associated with the CI/CD system 104.

At block 606 the method may include prioritizing, based on a confidence level analysis, the determined hypotheses 112.

At block 608 the method may include determining, based on a response to one of the prioritized hypotheses 116, failure resolution 120 to prevent failure associated with the CI/CD system 104.

At block 610 the method may include implementing the determined failure resolution 120.

Referring to FIGS. 1-4 and 7, and particularly FIG. 7, for the block diagram 700, the non-transitory computer readable medium 702 may include instructions 706 to analyze data 106 for a continuous integration and continuous deployment (CI/CD) system 104 to identify anomalous tests related to the CI/CD system 104, a likelihood of a file change of the CI/CD system 104 to cause a test failure, log messages associated with build failures, and/or tests that fail due to a similar reason.

The processor 704 may fetch, decode, and execute the instructions 708 to determine, based on a further analysis of the analyzed data 106, a plurality of hypotheses 112 on a cause of failure associated with the CI/CD system 104.

The processor 704 may fetch, decode, and execute the instructions 710 to prioritize, based on a confidence level analysis, the determined hypotheses 112.

The processor 704 may fetch, decode, and execute the instructions 712 to reprioritize, based on a response to one of the prioritized hypotheses 116, the prioritized hypotheses 116.

The processor 704 may fetch, decode, and execute the instructions 714 to determine, based on another response to one of the reprioritized hypotheses 116, failure resolution 120 to prevent failure associated with the CI/CD system 104.

The processor 704 may fetch, decode, and execute the instructions 716 to implement the determined failure resolution 120.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   analyze data for a continuous integration and continuous deployment (CI/CD) system to identify anomalous tests related to the CI/CD system, wherein the anomalous tests include tests that operate incorrectly;
   determine, based on a further analysis of the analyzed data, a plurality of hypotheses on a cause of failure associated with the CI/CD system;
   prioritize, based on a confidence level analysis, the determined hypotheses by analyzing specificity weights associated with a likelihood of a file change of the CI/CD system to cause a test failure, log messages associated with build failures, and tests that fail due to a similar reason;
   determine, based on a response to one of the prioritized hypotheses, failure resolution to prevent failure associated with the CI/CD system; and
   implement the determined failure resolution.

2. The apparatus according to claim 1, wherein the anomalous tests include
   a test that oscillates between passed and fail,
   a test that continuously fails, and
   a test that is unstable such that the test includes a specified number of failures surrounded by another specified number of passed runs of the test.

3. The apparatus according to claim 1, wherein the data further identifies the likelihood of the file change of the CI/CD system to cause the test failure, the likelihood based on a test that fails when a file is changed.

4. The apparatus according to claim 1, wherein the data further identifies a log cluster formed of the log messages and being correlated with a build failure.

5. The apparatus according to claim 1, wherein the data further identifies the tests that fail due to the similar reason.

6. The apparatus according to claim 1, wherein the instructions are further to cause the processor to:
   reprioritize, based on the response to one of the prioritized hypotheses, the prioritized hypotheses; and
   determine, based on another response to one of the reprioritized hypotheses, the failure resolution to prevent failure associated with the CI/CD system.

7. The apparatus according to claim 1, wherein the instructions are further to cause the processor to:
   determine, based on responses to the prioritized hypotheses, whether none of the prioritized hypotheses is relevant;

in response to a determination that none of the prioritized hypotheses is relevant, identify a plurality of predetermined hypotheses; and wherein the instructions to determine the failure resolution comprise instructions to determine, based additionally on another response to one of the predetermined hypotheses, failure resolution to prevent failure associated with the CI/CD system.

8. A computer implemented method comprising:
analyzing data for a continuous integration and continuous deployment (CI/CD) system to identify
anomalous tests related to the CI/CD system, wherein the anomalous tests include tests that operate incorrectly,
a likelihood of a file change of the CI/CD system to cause a test failure,
log messages associated with build failures, and
tests that fail due to a similar reason,
determining, based on a further analysis of the analyzed data, a plurality of hypotheses on a cause of failure associated with the CI/CD system;
prioritizing, based on a confidence level analysis, the determined hypotheses by analyzing specificity weights associated with the likelihood of the file change of the CI/CD system to cause the test failure, the log messages associated with build failures, and tests that fail due to the similar reason;
determining, based on a response to one of the prioritized hypotheses, failure resolution to prevent failure associated with the CI/CD system; and
implementing the determined failure resolution.

9. The method according to claim 8, further comprising:
reprioritizing, based on the response to one of the prioritized hypotheses, the prioritized hypotheses; and
wherein determining the failure resolution further comprises determining, based additionally on another response to one of the reprioritized hypotheses, the failure resolution to prevent failure associated with the CI/CD system.

10. The method according to claim 8, wherein the anomalous tests include
a test that oscillates between passed and fail,
a test that continuously fails, and
a test that is unstable.

11. The method according to claim 8, further comprising:
determining, based on responses to the prioritized hypotheses, whether none of the prioritized hypotheses is relevant;
in response to a determination that none of the prioritized hypotheses is relevant, identifying a plurality of predetermined hypotheses; and wherein determining the failure resolution further comprises determining, based additionally on another response to one of the predetermined hypotheses, failure resolution to prevent failure associated with the CI/CD system.

12. A non-transitory computer readable medium having stored thereon machine readable instructions, the machine readable instructions, when executed, cause a processor to:
analyze data for a continuous integration and continuous deployment (CI/CD) system to identify
anomalous tests related to the CI/CD system, wherein the anomalous tests include tests that operate incorrectly, and at least one of
a likelihood of a file change of the CI/CD system to cause a test failure,
log messages associated with build failures, or
tests that fail due to a similar reason,
determine, based on a further analysis of the analyzed data, a plurality of hypotheses on a cause of failure associated with the CI/CD system;
prioritize, based on a confidence level analysis, the determined hypotheses by analyzing specificity weights associated with the likelihood of the file change of the CI/CD system to cause the test failure, the log messages associated with build failures, and tests that fail due to the similar reason;
reprioritize, based on a response to one of the prioritized hypotheses, the prioritized hypotheses;
determine, based on another response to one of the reprioritized hypotheses, failure resolution to prevent failure associated with the CI/CD system; and
implement the determined failure resolution.

13. The non-transitory computer readable medium according to claim 12, wherein the machine readable instructions, when executed, further cause the processor to:
determine, based on responses to the prioritized and reprioritized hypotheses, whether none of the prioritized and reprioritized hypotheses is relevant;
in response to a determination that none of the prioritized and reprioritized hypotheses is relevant, identify a plurality of predetermined hypotheses; and
wherein the instructions to determine the failure resolution comprise instructions to determine, based additionally on another response to one of the predetermined hypotheses, failure resolution to prevent failure associated with the CI/CD system.

14. The non-transitory computer readable medium according to claim 12, wherein the anomalous tests include
a test that oscillates between passed and fail,
a test that continuously fails, and
a test that is unstable.

* * * * *